(12) United States Patent
Tsunoda (10) Patent No.: US 7,166,380 B2
(45) Date of Patent: Jan. 23, 2007

(54) POWER GENERATING SYSTEM

(75) Inventor: Tadashi Tsunoda, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 590 days.

(21) Appl. No.: 10/438,918

(22) Filed: May 16, 2003

(65) Prior Publication Data

US 2006/0280979 A1 Dec. 14, 2006

(30) Foreign Application Priority Data

May 16, 2002 (JP) ............................ 2002-141038
May 16, 2002 (JP) ............................ 2002-141039
May 16, 2002 (JP) ............................ 2002-141040

(51) Int. Cl.
*H01M 8/04* (2006.01)
*H01M 8/12* (2006.01)

(52) U.S. Cl. ..................... 429/26; 429/30; 429/32; 429/38

(58) Field of Classification Search ............. None
See application file for complete search history.

(56) References Cited

U.S. PATENT DOCUMENTS 6,213,234 B1 4/2001 Rosen et al.
6,255,010 B1 7/2001 George et al.

FOREIGN PATENT DOCUMENTS

| EP | 967676 | * 12/1999 |
| JP | 2001-516935 A | 10/2001 |
| WO | 99/13521 A1 | 3/1999 |

\* cited by examiner

*Primary Examiner*—Jonathan Crepeau
(74) *Attorney, Agent, or Firm*—Birch, Stewart, Kolasch and Birch, LLP (57) ABSTRACT

A power generating system is integrally provided with a gas turbine engine and a solid electrolyte type fuel cell. A compressor wheel, a turbine wheel, a heat exchanger and a burner of the gas turbine engine and the solid electrolyte type fuel cell are of axially symmetric shapes having a common axis of a rotary section comprising the compressor wheel and the turbine wheel. The heat exchanger and the solid electrolyte type fuel cell are disposed sequentially on one side in a direction of the axis with respect to the rotary section. This layout ensures that the entire power generating system can be compactly constructed, and further the flow rates of compressed air and exhaust gas can be made uniform, and the flows of the compressed air and the exhaust gas can be smoothened, thereby reducing the pressure loss and enhancing the power generating efficiency.

9 Claims, 6 Drawing Sheets

POWER GENERATING SYSTEM

This nonprovisional application claims priority under 35 U.S.C. § 119(a) on Patent Application No(s). 2002-141038; 2002-141039 and 2002-141040 filed in JAPAN on May 16, 2002, which is(are) herein incorporated by reference.

BACKGROUND OF THE INVENTION

1. Field of the Invention

The present invention relates to a power generating system integrally provided with a gas turbine and a solid electrolyte type fuel cell.

2. Description of the Related Art

A hybrid power system comprising a combination of a turbo-machine and a fuel cell is described in the published Japanese translation No. 2001-516935 of PCT application No. PCT/US98/19219. The turbo-machine is adapted to drive a generator by rotating a power turbine by a high-pressure gas generated by burning a fuel in a combustor, thereby generating electricity, and the fuel cell is adapted to cause the reaction between fuel and air passing through a compressor and a recuperator to be heated, thereby generating electricity.

A vehicle including a fuel cell and a generator driven by a gas turbine engine is described in U.S. Pat. No. 6,213,234. A reduction of fuel consumption can be provided without excessive increase in the size of the fuel cell by supplying about 50% of the maximum electric power required to drive the vehicle from the fuel cell. When the electric power required by the vehicle is small, the fuel cell effectively supplies all or most of the required electric power.

There is a vehicle described in U.S. Pat. No. 6,255,010, in which a power generating system including a gas turbine engine, a fuel cell and a generator is accommodated in a common pressure vessel and operated in a pressurized state.

If the gas turbine engine and the fuel cell are disposed separately, the size of the entire system disadvantageously increases, and hence it is conceived that the fuel cell is accommodated in a casing of the gas turbine to provide compactness. However, even if the fuel cell is combined simply with the gas turbine engine, the compactness of the system is limited. Moreover, it is difficult to effectively absorb the thermal expansions of the gas turbine engine and the fuel cell heated to a high temperature of several hundred degree during operation of the power generating system, leading to a possibility that the thermal stresses of the gas turbine engine and the fuel cell are increased to reduce power generating efficiency and durability of the power generating system.

In order to reduce the fuel consumption in a power generating system integrally including a gas turbine engine and a solid electrolyte type fuel cell to enhance the power generating efficiency, it is required to effectively utilize waste heat of the power generating system. However, it is difficult to effectively utilize the waste heat only by disposing the gas turbine engine and the solid electrolyte type fuel cell with a distance therebetween, or combining the fuel cell simply with the gas turbine engine.

In addition, in the power generating system integrally provided with the gas turbine engine and the solid electrolyte type fuel cell, when the solid electrolyte type fuel cell is activated by utilizing the waste heat generated by a burner of the gas turbine engine, it is difficult to effectively utilize the waste heat only by disposing the gas turbine engine and the solid electrolyte type fuel cell with a distance between them, or combining the fuel cell simply with the gas turbine engine.

SUMMARY OF THE INVENTION

The present invention has been accomplished with the above circumstance in view, and it is a first object of the present invention to ensure that a power generating system integrally provided with a gas turbine engine and a solid electrolyte type fuel cell is constructed compactly, and enhancements in power generating efficiency and durability are provided.

It is a second object of the present invention to provide a power generating system integrally provided with a gas turbine engine and a solid electrolyte type fuel cell, wherein an enhancement in power generating efficiency is provided by effectively utilizing a waste heat.

It is a third object of the present invention to provide a power generating system integrally provided with a gas turbine engine and a solid electrolyte type fuel cell, wherein the solid electrolyte type fuel cell is activated by effectively utilizing a waste heat from a burner of the gas turbine engine.

To achieve the first object, according to a first feature of the present invention, there is proposed a power generating system integrally provided with a gas turbine engine and a solid electrolyte type fuel cell, the gas turbine engine including a compressor wheel, a turbine wheel, a heat exchanger and a burner, the compressor wheel being adapted to supply compressed air through the heat exchanger to the solid electrolyte type fuel cell and the burner, the turbine wheel being adapted to be driven by exhaust gas from the solid electrolyte type fuel cell and the burner to drive the compressor wheel, and the heat exchanger being adapted to conduct heat exchange between the exhaust gas from the turbine wheel and the compressed air from the compressor wheel, wherein the compressor wheel, the turbine wheel, the heat exchanger, the burner and the solid electrolyte type fuel cell are of axially symmetric shapes commonly having an axis of a rotary section comprising the compressor wheel and the turbine wheel, and the heat exchanger and the solid electrolyte type fuel cell are disposed sequentially on one side in a direction of the axis with respect to the rotary section.

With the above arrangement, the solid electrolyte type fuel cell and the compressor wheel, the turbine wheel, the heat exchanger and the burner which are the components of the gas turbine engine are formed into the axially symmetric shapes commonly having the axis of the rotary section comprising the compressor wheel and the turbine wheel, and the heat exchanger and the solid electrolyte type fuel cell are disposed sequentially on one side in the direction of the axis with respect to the rotary section. Therefore, it is possible not only to compactly construct the entire power generating system but also to make uniform the flow rates of the compressed air and the exhaust gas flowing into the heat exchanger and the solid electrolyte type fuel cell and further to smoothen the flows of the compressed air and the exhaust gas to reduce the pressure loss, thereby enhancing the power generating efficiency. With the above-described axially symmetric disposition, it is also possible to suppress the thermal stress generated by the thermal expansion of the power generating system, thereby enhancing the power generating efficiency and the durability.

To achieve the first object, according to a second feature of the present invention, in addition to the first feature, the heat exchanger and the solid electrolyte type fuel cell are annular about the axis.

With the above arrangement, the heat exchanger and the solid electrolyte type fuel cell are annular about the axis and hence, the components of the gas turbine engine can be accommodated in a space radially inside the heat exchanger and the solid electrolyte type fuel cell, to thereby provide compactness. Moreover, the heat generated by the gas turbine engine can be recovered by the heat exchanger and the solid electrolyte type fuel cell disposed at radially outer locations.

To achieve the first object, according to a third feature of the present invention, in addition to the first feature, a compressed-air passage for guiding the compressed air from the compressor wheel to the heat exchanger is disposed radially outside an exhaust gas passage for guiding the exhaust gas from the turbine wheel to the heat exchanger.

The compressed-air passage in the third feature of the present invention corresponds to a first compressed-air passage 12 in an embodiment.

With the above arrangement, the compressed-air passage is disposed radially outside the exhaust gas passage and hence, the heat escaped from the exhaust gas passage, through which the exhaust gas having a relatively high temperature is passed, is recovered in the compressed-air passage through which the compressed air having a relatively low temperature is passed, thereby further enhancing the power generating efficiency.

To achieve the first object, according to a fourth feature of the present invention, in addition to the first feature, the solid electrolyte type fuel cell is annular about the axis, and the burner is disposed in a space defined radially inside the solid electrolyte type fuel cell.

With the above arrangement, the burner is disposed in the space defined radially inside the annular solid electrolyte type fuel cell and hence, the heat generated by the burner can be recovered in the solid electrolyte type fuel cell, and especially, the solid electrolyte type fuel cell at an initial stage of the starting can be activated early to enhance the power generating efficiency.

To achieve the second object, according to a fifth feature of the present invention, there is provided a power generating system integrally provided with a gas turbine engine and a solid electrolyte type fuel cell, the gas turbine engine including a compressor wheel, a turbine wheel, a heat exchanger and a burner, the compressor wheel being adapted to supply compressed air through the heat exchanger to the solid electrolyte type fuel cell and the burner, the turbine wheel being adapted to be driven by exhaust gas from the solid electrolyte type fuel cell and the burner to drive the compressor wheel, and the heat exchanger being adapted to conduct heat exchange between the exhaust gas from the turbine wheel and the compressed air from the compressor wheel, wherein the heat exchanger, the burner and the solid electrolyte type fuel cell are disposed on an axis of a rotary section comprising the compressor wheel and the turbine wheel; a space for discharging the exhaust gas from the solid electrolyte type fuel cell or the burner toward the turbine wheel is defined between the turbine wheel and the burner; and the heat exchanger and the solid electrolyte type fuel cell are disposed radially outside the space.

With the above arrangement, the heat exchanger, the burner and the solid electrolyte type fuel cell are disposed on the axis of the rotary section comprising the compressor wheel and the turbine wheel, and the heat exchanger and the solid electrolyte type fuel cell are disposed radially outside the space for discharging the exhaust gas from the solid electrolyte type fuel cell or the burner toward the turbine wheel. Therefore, the waste heat of the solid electrolyte type fuel cell or the burner discharged to the space can be recovered effectively by the burner and the solid electrolyte type fuel cell and thus, the escape of the heat to the outside can be suppressed, thereby enhancing the power generating efficiency of the power generating system to reduce the fuel consumption.

To achieve the second object, according to a sixth feature of the present invention, in addition to the fifth feature, a first compressed-air passage for guiding the compressed air from the compressor wheel to the heat exchanger is disposed radially outside an exhaust gas passage for guiding the exhaust gas from the turbine wheel to the heat exchanger, and a second compressed-air passage for guiding the compressed air from the heat exchanger to the solid electrolyte type fuel cell is disposed radially outside the space.

With the above arrangement, the first compressed-air passage for guiding the compressed air from the compressor wheel to the heat exchanger is disposed radially outside the exhaust gas passage for guiding the exhaust gas from the turbine wheel to the heat exchanger. Therefore, the heat escaped from the exhaust gas passage, through which the exhaust gas having a relatively high temperature is passed, can be recovered in the compressed-air passage through which the compressed air having a relatively low temperature is passed, thereby further enhancing the power generating efficiency. Further, since the second compressed-air passage for guiding the compressed air from the heat exchanger to the solid electrolyte type fuel cell is disposed radially outside the space, the heat of the exhaust gas discharged into the space can be recovered in the second compressed-air passage to further enhance the power generating efficiency.

To achieve the second object, according to a seventh feature of the present invention, in addition to the sixth feature, the second compressed-air passage is disposed radially outside the solid electrolyte type fuel cell.

With the above arrangement, the second compressed-air passage is disposed radially outside the solid electrolyte type fuel cell and hence, the heat generated by the solid electrolyte type fuel cell can be recovered in the second compressed-air passage to further enhance the power generating efficiency.

To achieve the third object, according to an eighth feature of the present invention, there is provided a power generating system integrally provided with a gas turbine engine and a solid electrolyte type fuel cell, the gas turbine engine including a compressor wheel, a turbine wheel, a heat exchanger and a burner, the compressor wheel being adapted to supply compressed air through the heat exchanger to the solid electrolyte type fuel cell and the burner, the turbine wheel being adapted to be driven by exhaust gas from the solid electrolyte type fuel cell and the burner to drive the compressor wheel, and the heat exchanger being adapted to conduct heat exchange between the exhaust gas from the turbine wheel and the compressed air from the compressor wheel, wherein the heat exchanger, the burner and the solid electrolyte type fuel cell are disposed on an axis of a rotary section comprising the compressor wheel and the turbine wheel, and the solid electrolyte type fuel cell is disposed to surround a radially outer side of the burner.

With the above arrangement, the heat exchanger, the burner and the solid electrolyte type fuel cell are disposed on the axis of the rotary section comprising the compressor wheel and the turbine wheel, and the solid electrolyte type fuel cell is disposed to surround the radially outer side of the burner. Therefore, the heat generated by the burner can be recovered by the solid electrolyte type fuel cell and thus, the escape of the heat to the outside can be suppressed, thereby providing an enhancement in power generating efficiency. Especially, the solid electrolyte type fuel cell at an initial stage of the starting can be activated early to enhance the power generating efficiency.

To achieve the third object, according to a ninth feature of the present invention, in addition to the eighth feature, the gas turbine engine is started by operating the burner, and operation of the burner is terminated after the solid electrolyte type fuel cell is activated by waste heat of the gas turbine engine.

With the above arrangement, the burner is operated only upon the start of the gas turbine engine, and when the solid electrolyte type fuel cell is activated by the waste heat of the gas turbine engine, the operation of the burner is terminated. Therefore, the operation of the burner, which consumes a large amount of the fuel as compared with the solid electrolyte type fuel cell, can be minimized to enhance the power generating efficiency.

DESCRIPTION OF THE PREFERRED EMBODIMENTS

A first embodiment of the present invention will now be described with reference to FIGS. 1 and 2.

Figure 1:
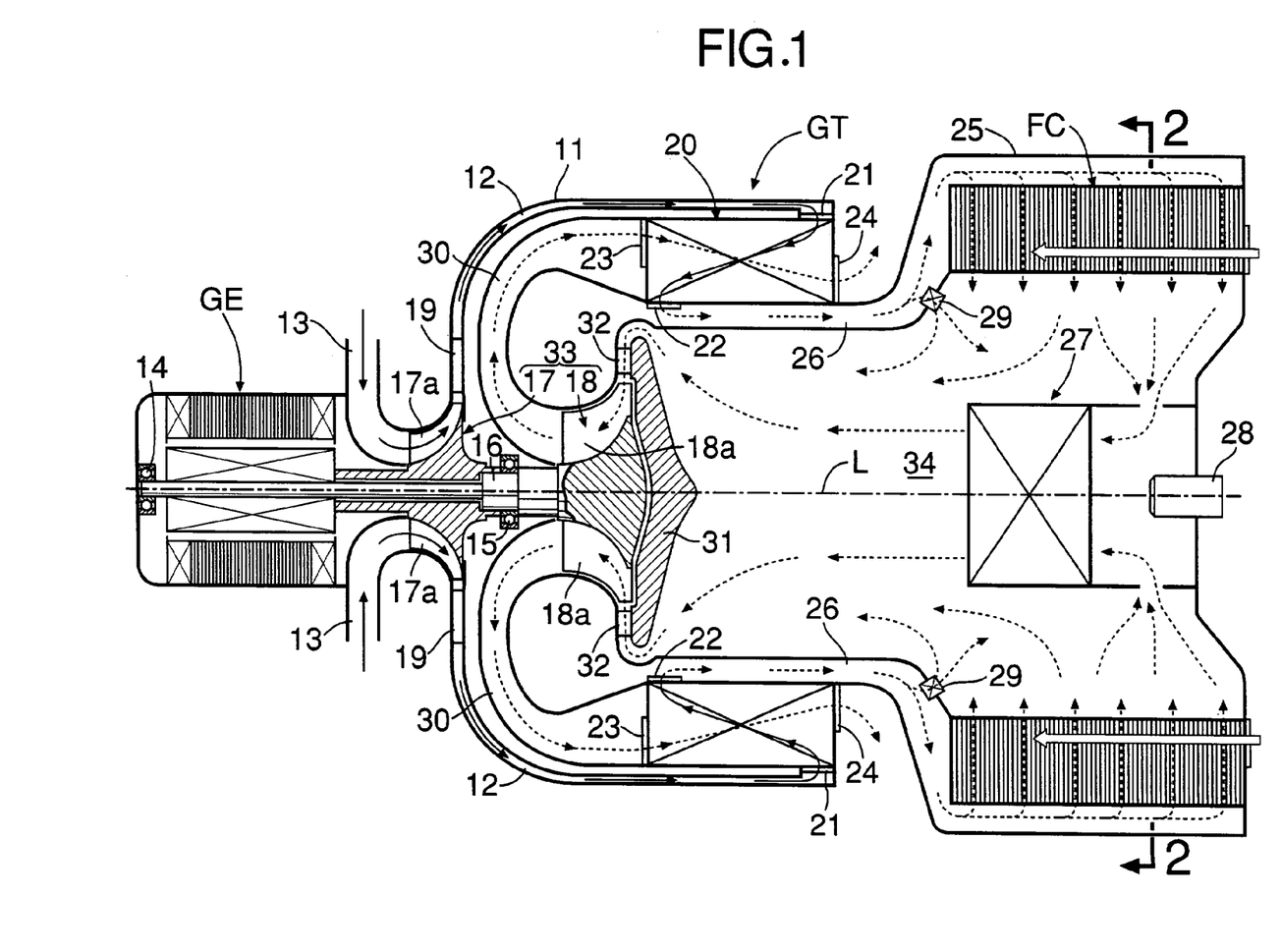
FIG. 1 is a vertical sectional view of a power generating system according to a first embodiment of the present invention.
Figure 2:
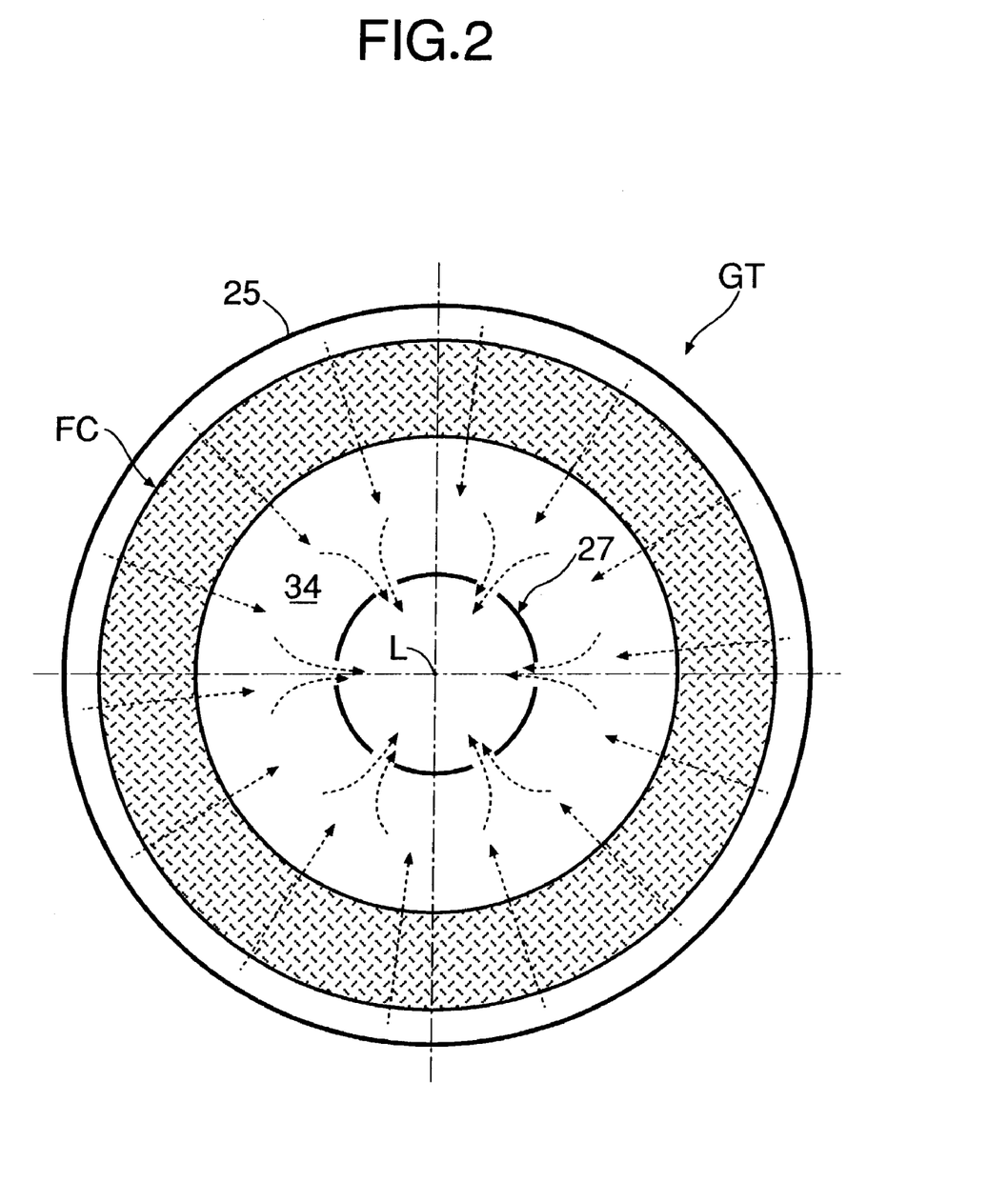
FIG. 2 is a sectional view taken along a line 2—2 in FIG. 1.

A power generating system comprising a solid electrolyte type fuel cell FC integral with a gas turbine engine GT is shown in FIGS. 1 and 2. The gas turbine engine GT includes a substantially cup-shaped front casing 11, and an intake passage 13 leading to an air cleaner and a silencer (not shown) is connected to an upstream portion of a first compressed-air passage 12 defined to extend along an inner surface of the front casing 11. A centrifugal compressor wheel 17 and a centrifugal turbine wheel 18 are fixed coaxially and adjacent each other to a rotary shaft 16 extending through a central portion of the intake passage 13 and supported by a pair of bearings 14 and 15. A plurality of compressor blades 17a formed radially on an outer periphery of the compressor wheel 17 face the intake passage 13, and a plurality of compressor diffusers 19 are mounted in the compressed-air passage 12 at locations immediately downstream from the compressor blades 17a. A generator GE driven by the turbine wheel 18 is mounted at a front end of the rotary shaft 16.

A recuperative heat exchanger 20 formed into an annular shape is disposed at a rear end of the front casing 11. The heat exchanger 20 has compressed-air passages and exhaust gas passages defined alternately in a circumferential direction by radially disposing a large number of thin metal plates, and includes a compressed-air inlet 21 leading to a downstream end of the first compressed-air passage 12 at a location closer to an outer periphery of its rear end, a compressed-air outlet 22 at a location closer to an inner periphery of its front end, an exhaust gas inlet 23 at a location closer to the outer periphery of at its front end, and an exhaust as outlet 24 leading to the atmospheric air at a location closer to the inner periphery of its rear end. The heat exchanger 20 is designed so that compressed air having a relatively low temperature shown by arrows of solid lines and an exhaust gas having a relatively high temperature and shown by arrows of broken lines are allowed to flow in opposite directions, whereby a large difference in temperature between the compressed air and the exhaust gas is maintained over the entire lengths of flow paths thereof to enhance the heat exchange efficiency.

A stepped cylindrical rear casing 25 is connected rearwards from an inner peripheral surface of the heat exchanger 20, and the solid electrolyte type fuel cell FC formed into an annular shape is accommodated in a rear half of the rear casing 25. A second compressed-air passage 26 defined to extend along an inner peripheral surface of the rear casing 25 is connected at its upstream end to the compressed-air outlet 22 and at its downstream end to an outer peripheral portion of the solid electrolyte type fuel cell FC. A single-drum type burner 27 is disposed radially inside the solid electrolyte type fuel cell FC, and a fuel injection nozzle 28 is mounted at a rear end of the burner 27. On-off valves 29 for opening and closing openings bypassing the solid electrolyte type fuel cell FC are mounted at an intermediate portion of the second compressed-air passage 26.

An exhaust gas passage 30 extending from the plurality of turbine blades 18a formed radially on the outer periphery of the turbine wheel 18 mounted at the rear end of the rotary shaft 16 is connected to the exhaust gas inlet 23 of the heat exchanger 20, and a radially outer portion of the exhaust gas passage 30 is covered with the first compressed-air passage 12. A heat shield plate 31 is disposed to cover a rear surface of the turbine wheel 18, and turbine nozzles 32 are mounted on an outer peripheral portion of the heat shield plate 31 to face the turbine blades 18a.

Each of components for the gas turbine engine GT (namely, the compressor wheel 17, the turbine wheel 18, the heat exchanger 20 and the burner 27) and the solid electrolyte type fuel cell FC has an axially symmetric shape with respect to an axis L of the rotary shaft 16 supporting a rotary section 33 comprising the compressor wheel 17 and the turbine wheel 18. The annular heat exchanger 20 is disposed radially outside a space 34 defined in the rear of the rotary section 33 in a direction of the axis L; and further, the annular solid electrolyte type fuel cell FC is disposed in the rear of the heat exchanger 20 in the direction of the axis L, and the burner 27 is disposed radially inside the solid electrolyte type fuel cell FC.

A known solid electrolyte type fuel cell FC comprises a large number of cell elements each formed of an annular thin plate and laminated one on another in the direction of the axis L with separators interposed between the adjacent cell elements and having the same shape as the cell elements. Each of the cell elements is comprised of a cathode (an air pole) and an anode (a fuel pole) laminated on opposite sides of a ceramic-based solid electrolyte. Air and a fuel are supplied through passages defined in the separators to the cathodes and the anodes, respectively, to react with each other in an interface of the solid electrolyte, thereby generating an electric energy.

The operation of the embodiment of the present invention having the above-described arrangement will be described below.

Air drawn from the intake passage 13 and compressed by the compressor wheel 17 during operation of the power generating system is fed via the first compressed-air passage 12 to the heat exchanger 20, where it is heated to near the temperature of the exhaust gas by the heat exchange with the exhaust gas having the high temperature (about 800° C.). The compressed air passed through the heat exchanger 20 to have a high temperature is passed through the second compressed-air passage 26 to reach the solid electrolyte-type fuel cell FC and is then passed through the solid electrolyte-type fuel cell FC from a radially outer side to a radially inner side. On the other hand, the fuel (see a blank arrow) such as natural gas supplied to the solid electrolyte-type fuel cell FC is reformed into $H_2$ and CO and reacts with the air supplied from the heat exchanger 20 in the solid electrolyte-type fuel cell FC having a high temperature, to thereby generate an electricity.

The solid electrolyte-type fuel cell FC is not activated at the start of the power generating system and hence, the burner 27 is operated temporarily to heat the solid electrolyte-type fuel cell FC up to an activating temperature. More specifically, when the compressed air from the compressor wheel 17 is supplied from the heat exchanger 20 via the solid electrolyte-type fuel cell FC to the burner 27 and the fuel ejected from the fuel injection nozzle 28 is mixed with the compressed air and burned, an exhaust gas having a high temperature is supplied to the heat exchanger 20, where the heat exchange is carried out, whereby the temperature of the compressed air to be supplied to the solid electrolyte type fuel cell FC rises. The turbine wheel 18 is driven by the exhaust gas generated in the burner 27 and hence, the suction and compression of the air by the compressor wheel 17 are effectively carried out, whereby the temperature of the compressed air to be supplied to the solid electrolyte type fuel cell FC further rises.

As a result, when the temperature of the compressed air to be supplied to the solid electrolyte type fuel cell FC reaches a predetermined temperature (e.g., 500° C. to 600° C.), even if the injection of the fuel from the fuel injection nozzle 28 is terminated to bring the burner 27 into an inoperative state, the operation of the power generating system is continued because the temperature of the solid electrolyte type fuel cell FC reaches the activating temperature. In addition, it is possible to control the temperature of the solid electrolyte type fuel cell FC and to reduce the pressure loss in the solid electrolyte type fuel cell FC by changing the opening degrees of the on-off valve 29 to control the ratio between the amount of the compressed air passing through the solid electrolyte type fuel cell FC and the amount of the compressed air bypassing the solid electrolyte type fuel cell FC.

Because the burner 27 is mounted for movement in the direction of the axis L and moved to protrude into the rear casing 25 at the start thereof and to retract out of the rear casing 25 after the start, the exhaust gas from the solid electrolyte type fuel cell FC smoothly flows without interfering with the burner 27 during operation of the power generating system after the start of the burner, so that a further enhancement in power generating efficiency can be expected.

Therefore, an electric power generated in the generator GE driven by the rotary shaft 16 of the turbine wheel 18 and an electric power generated by the solid electrolyte type fuel cell FC are united together and output. About 50% of a chemical energy of the fuel is converted into an electric energy in the solid electrolyte type fuel cell FC, and about 15% is converted into an electric energy in the generator GE and hence, the efficiency of the power generating system reaches a level as extremely high as 65%.

Since the compressor wheel 17, the turbine wheel 18, the heat exchanger 20, the burner 27 and the solid electrolyte type fuel cell FC are disposed axially symmetrically with respect to the axis L of the rotary section 33 comprising the compressor wheel 17 and the turbine wheel 18, the flows of the compressed air and the exhaust gas in the gas turbine GT and the solid electrolyte type fuel cell FC are axially symmetric and made uniform in the circumferential direction. Therefore, the flow rates of the compressed air and the exhaust gas flowing into the heat exchanger 20 can be made uniform, and the flow rate of the compressed air flowing into the solid electrolyte type fuel cell FC can be made uniform, thereby contributing to an enhancement in heat-exchanging efficiency in the heat exchanger 20 and an enhancement in power generating efficiency in the solid electrolyte type fuel cell FC. In addition, the axial symmetric disposition of the power generating system reduces the pressure loss to provide an enhancement in power generating efficiency and a reduction of fuel consumption. Further, the temperature profiles of the insides of the gas turbine GT and the solid electrolyte type fuel cell FC are axially symmetric, whereby the thermal deformation of the various members are minimized, whereby smooth rotations of the compressor wheel 17 and the turbine wheel 18 are ensured, and the damage or the like to the parts made of the ceramic due to a thermal stress is prevented, leading to an enhanced durability. Furthermore, the parts such as casings and passages can be arranged axially symmetrically and hence, can be made of a thin material such as a metal plate to achieve a reduction in weight, and further the thermal loss during cold start can be reduced by a reduction in heat mass, to further reduce the fuel consumption.

Since the heat exchanger 20 and the solid electrolyte type fuel cell FC formed into the annular shapes are disposed at the innermost location in the power generating system, the components such as the burner 27 of the gas turbine GT can be accommodated in the space 34 defined radially inside the heat exchanger 20 and the solid electrolyte type fuel cell FC, thereby achieving compactness, and the heat generated by the gas turbine GT can be recovered by the heat exchanger 20 and the solid electrolyte type fuel cell FC disposed at the outer locations. Especially, since the burner 27 is disposed in the space 34 radially inside the solid electrolyte type fuel cell FC, the size of the power generating system in the direction of the axis L can be reduced, and further the heat can be recovered by the solid electrolyte type fuel cell FC. Especially, when the burner 27 is operated to start the power generating system, the solid electrolyte type fuel cell FC disposed at the radially outer location can be heated effectively and activated early to contribute to a reduction of fuel consumption.

Since the rotary section 33 comprising the compressor wheel 17 and the turbine wheel 18, the heat exchanger 20 and the solid electrolyte type fuel cell FC are disposed sequentially rearwards from the front side along the axis L, the radial dimension of the power generating system can be reduced, and further the flow rates of the compressed air and the exhaust gas can be made uniform, and the flows of the compressed air and the exhaust gas can be smoothened to reduce the pressure loss and enhance the power generating efficiency.

In addition, since the first compressed-air passage 12 for guiding the compressed air having the relatively low temperature from the compressor wheel 17 to the heat exchanger 20 is disposed to cover the radially outer portion of the exhaust gas passage 30 for guiding the exhaust gas having the relatively high temperature, the heat escaped from the exhaust gas passage 30 having the high temperature can be recovered by the first compressed-air passage 12 having the low temperature, whereby the escape of the heat from the front casing 11 can be prevented to further enhance the power generating efficiency. Further, since the second compressed-air passage 26 is disposed to cover the radially outer portion of the solid electrolyte type fuel cell FC, the heat generated by the solid electrolyte type fuel cell FC can be recovered by the second compressed-air passage 26, so that the heat can be prevented from escaping from the rear casing 25 to the outside to further enhance the power generating efficiency.

Figure 3:
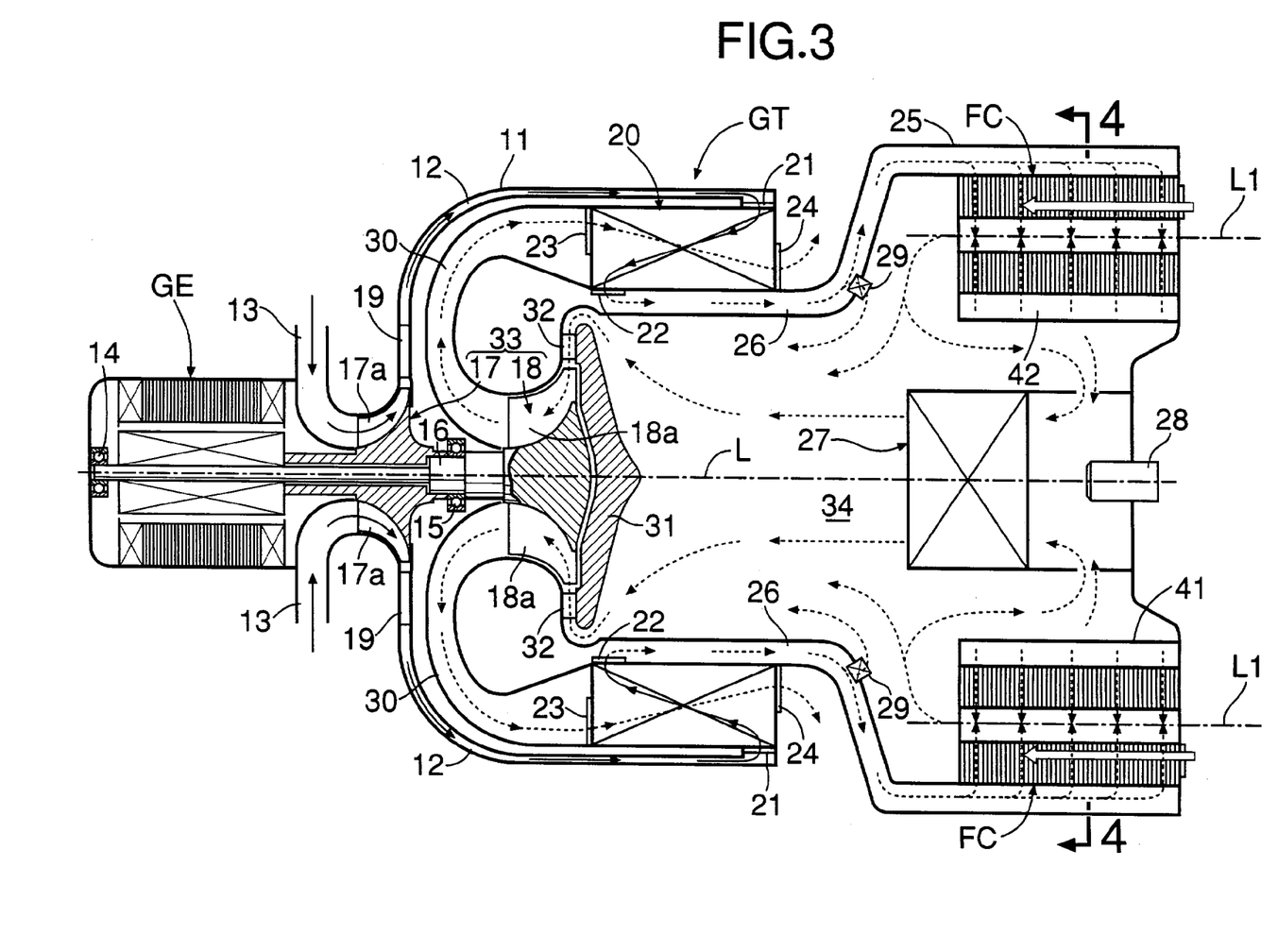
FIG. 3 is a vertical sectional view of a power generating system according to a second embodiment of the present invention.
Figure 4:
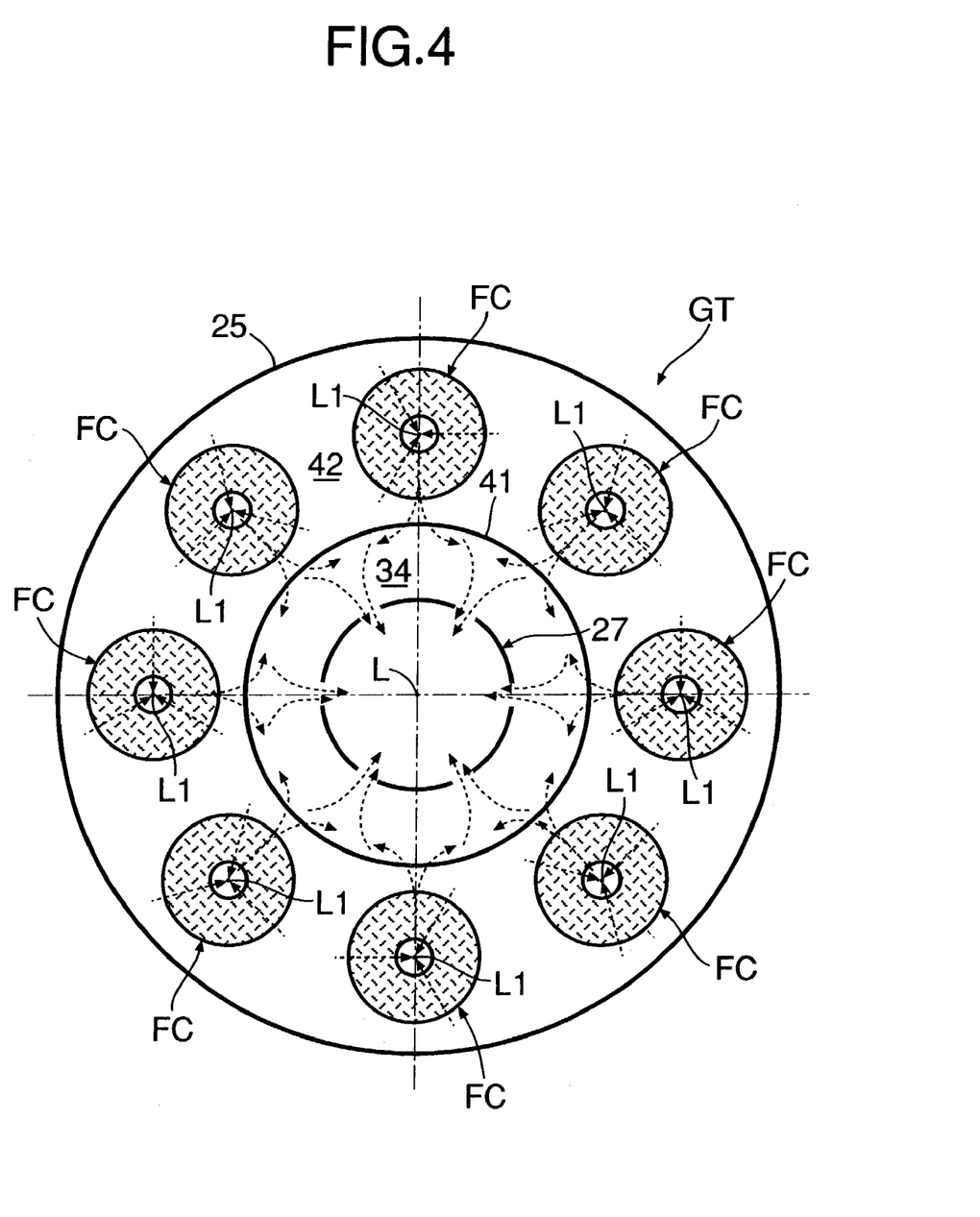
FIG. 4 is a sectional view taken along a line 4—4 in FIG. 3.

A second embodiment of the present invention will now be described with reference to FIGS. 3 and 4. The second embodiment is different from the first embodiment in respect of the shape of the solid electrolyte type fuel cell FC, but the arrangement of the other components is the same as that in the first embodiment.

In the second embodiment, a plurality of (e.g., eight) solid electrolyte type fuel cells FC formed into an annular shape are disposed at equal distances in a circumferential direction to surround the axis L of the rotary section 33. The solid electrolyte type fuel cells FC are accommodated in an annular space 42 defined by a rear casing 25 and a cylindrical partition wall 41 in a state in which the axe L1 of the solid electrolyte type fuel cells FC is parallel to the axis L of the rotary section 33.

Also according to the second embodiment, the same function and effect as those in the first embodiment can be achieved, because the eight solid electrolyte type fuel cells FC are disposed axially symmetrically with respect to the axis L of the rotary section 33. In addition, the diameter of each of the solid electrolyte type fuel cells FC is smaller than that in the first embodiment and hence, their cell elements and separators are small and easy to manufacture.

Figure 5:
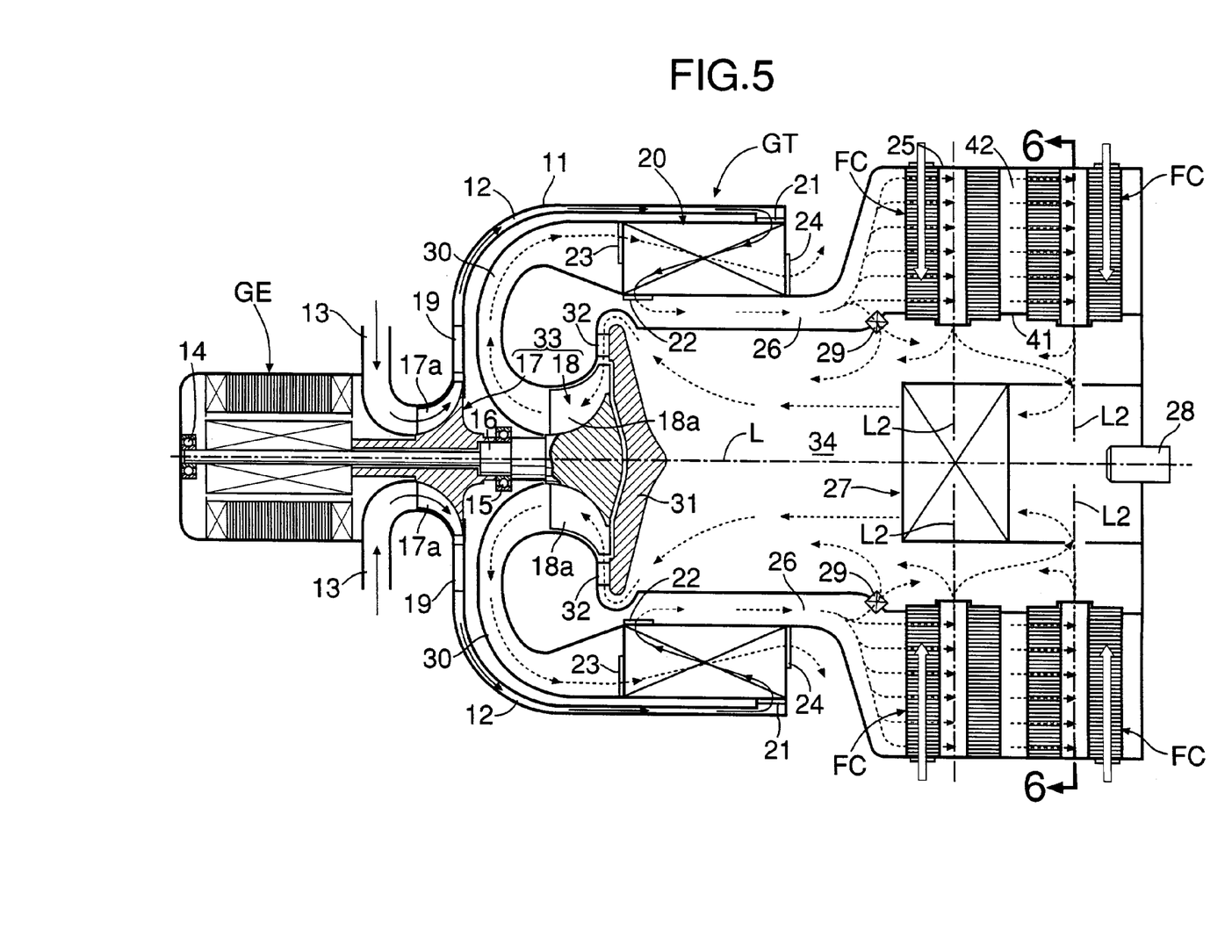
FIG. 5 is a vertical sectional view of a power generating system according to a third embodiment of the present invention.
Figure 6:
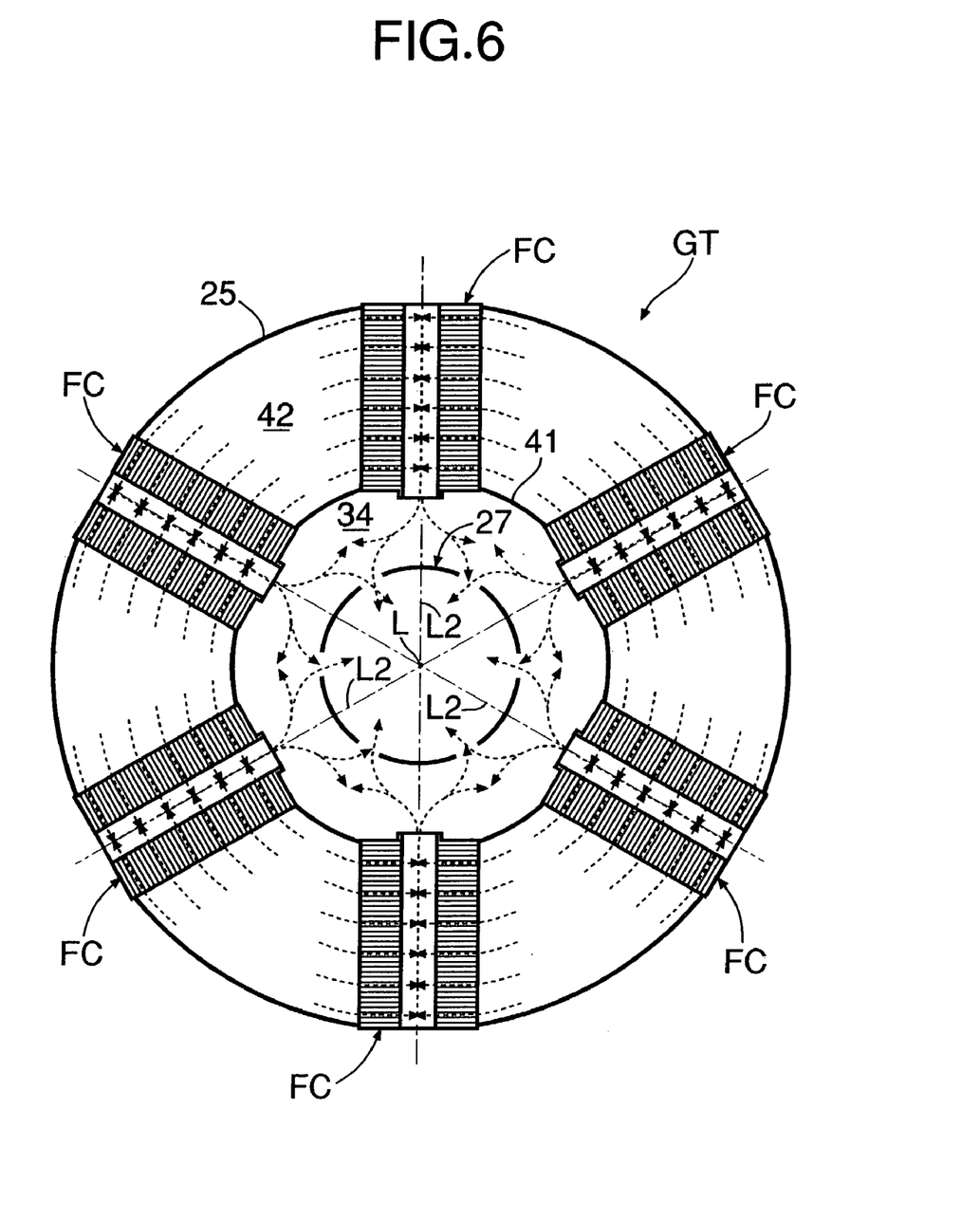
FIG. 6 is a sectional view taken along a line 6—6 in FIG. 5.

A third embodiment of the present invention will now be described with reference to FIGS. 5 and 6. The third embodiment is also different from the first embodiment in respect of the shape of the solid electrolyte type fuel cell FC, but the arrangement of the other components is the same as that in the first embodiment.

A plurality of (e.g., twelve) solid electrolyte type fuel cells FC formed into an annular shape are disposed in two rows in a direction of the axis L of the rotary section 33 and at equal distances in a circumferential direction to surround the axis L. The six solid electrolyte type fuel cells FC in each of the rows are accommodated in an annular space 42 defined by a rear casing 25 and a cylindrical partition wall 41 in a state in which their axes L2 are arranged radially with respect to the axis L of the rotary section 33.

Also according to the third embodiment, the same function and effect as those in the first embodiment can be achieved, because the twelve solid electrolyte type fuel cells FC are disposed axially symmetrically with respect to the axis L of the rotary section 33. In addition, the diameter of each of the solid electrolyte type fuel cells FC is smaller than that in the first embodiment and hence, their cell elements and separators are small and easy to manufacture. Further, the outer diameter of the power generating system can be reduced, while ensuring the same generating capacity by increasing as desired the number of the rows of the solid electrolyte type fuel cells FC in the direction of the axis.

As discussed above, the present invention is applicable to the power generating system adapted to operate the solid electrolyte type fuel cell utilizing a waste heat from the gas turbine engine. The gas turbine may be mounted on a moving body such as an automobile, or may be stationary.

Although the embodiments of the present invention have been described in detail, it will be understood that various modifications in design may be made without departing from the subject matter of the invention.

What is claimed is:

1. A power generating system integrally provided with a gas turbine engine and a solid electrolyte type fuel cell, said gas turbine engine including a compressor wheel, a turbine wheel, a heat exchanger and a burner, said compressor wheel being adapted to supply compressed air through the heat exchanger to the solid electrolyte type fuel cell and the burner, said turbine wheel being adapted to be driven by exhaust gas from the solid electrolyte type fuel cell and the burner to drive the compressor wheel, and said heat exchanger being adapted to conduct heat exchange between the exhaust gas supplied from the turbine wheel and the compressed air from the compressor wheel, wherein the compressor wheel, the turbine wheel, the heat exchanger, the burner and the solid electrolyte type fuel cell are of axially symmetric shapes commonly having an axis of a rotary section comprising the compressor wheel and the turbine wheel, and the heat exchanger and the solid electrolyte type fuel cell are disposed sequentially on one side in a direction of said axis with respect to said rotary section.

2. A power generating system according to claim 1, wherein the heat exchanger and the solid electrolyte type fuel cell are annular about said axis.

3. A power generating system according to claim 1, wherein a compressed-air passage for guiding the compressed air from the compressor wheel to the heat exchanger is disposed radially outside an exhaust gas passage for guiding the exhaust gas from the turbine wheel to the heat exchanger.

4. A power generating system according to claim 1, wherein the solid electrolyte type fuel cell is annular about said axis, and the burner is disposed in a space defined radially inside the solid electrolyte type fuel cell.

5. A power generating system integrally provided with a gas turbine engine and a solid electrolyte type fuel cell, said gas turbine engine including a compressor wheel, a turbine wheel, a heat exchanger and a burner, said compressor wheel being adapted to supply compressed air through the heat exchanger to the solid electrolyte type fuel cell and the burner, said turbine wheel being adapted to be driven by exhaust gas from the solid electrolyte type fuel cell and the burner to drive the compressor wheel, and said heat exchanger being adapted to conduct heat exchange between the exhaust gas supplied from the turbine wheel and the compressed air from the compressor wheel, wherein the heat exchanger, the burner and the solid electrolyte type fuel cell are disposed on an axis of a rotary section comprising the compressor wheel and the turbine wheel; a space for discharging the exhaust gas from the solid electrolyte type fuel cell or the burner toward the turbine wheel is defined between the turbine wheel and the burner; and the heat exchanger and the solid electrolyte type fuel cell are disposed radially outside said space.

6. A power generating system according to claim 5, wherein a first compressed-air passage for guiding the compressed air from the compressor wheel to the heat exchanger is disposed radially outside an exhaust gas passage for guiding the exhaust gas from the turbine wheel to the heat exchanger, and a second compressed-air passage for guiding the compressed air from the heat exchanger to the solid electrolyte type fuel cell is disposed radially outside said space.

7. A power generating system according to claim 6, wherein the second compressed-air passage is disposed radially outside the solid electrolyte type fuel cell.

8. A power generating system integrally provided with a gas turbine engine and a solid electrolyte type fuel cell, said gas turbine engine including a compressor wheel, a turbine wheel, a heat exchanger and a burner, said compressor wheel being adapted to supply compressed air through the heat exchanger to the solid electrolyte type fuel cell and the burner, said turbine wheel being adapted to be driven by exhaust gas from the solid electrolyte type fuel cell and the burner to drive the compressor wheel, and said heat exchanger being adapted to conduct heat exchange between the exhaust gas supplied from the turbine wheel and the compressed air from the compressor wheel, wherein the heat exchanger, the burner and the solid electrolyte type fuel cell are disposed on an axis of a rotary section comprising the compressor wheel and the turbine wheel, and the solid electrolyte type fuel cell is disposed to surround a radially outer side of the burner.

9. A power generating system according to claim 8, wherein the gas turbine engine is started by operating the burner, and operation of the burner is terminated after the solid electrolyte type fuel cell is activated by waste heat of the gas turbine engine.

* * * * *